United States Patent
Bockler

[15] 3,662,894
[45] May 16, 1972

[54] CENTRIFUGAL CLEANING FILTER

[72] Inventor: Herbert Bockler, Schwabisch Gmund, Germany

[73] Assignee: Schenk-Filterbau GmbH, Waldstetten, Germany

[22] Filed: July 2, 1970

[21] Appl. No.: 51,978

[30] Foreign Application Priority Data
July 25, 1969    Germany........................G 69 29 523.4

[52] U.S. Cl..............................210/330, 210/332, 210/344
[51] Int. Cl. ....................................B01d 35/16, B01d 29/42
[58] Field of Search....................210/330, 331, 332, 333, 344

[56] References Cited
UNITED STATES PATENTS
3,056,504   10/1962   Lavallee..............................210/333 X FOREIGN PATENTS OR APPLICATIONS
1,328,052   4/1963   France..................................210/330

Primary Examiner—Frank A. Spear, Jr.
Attorney—Edwin E. Greigg

[57] ABSTRACT

A centrifugal filter having a vertical rotatable shaft supporting horizontal filter elements within a housing. The housing bottom has an outlet aperture swept by ejector shovels mounted on the shaft, the shovels having portions of different inclination.

13 Claims, 4 Drawing Figures

3,662,894

CENTRIFUGAL CLEANING FILTER

FIELD OF THE INVENTION

The invention relates to a centrifugal cleaning filter having a vertical hollow shaft rotatable in a housing, and having mounted thereon horizontal filter elements disposed above each other.

BACKGROUND OF THE INVENTION

In filters of the type referred to, the elimination of the residue from the filtering process requires the provision of residue ejector means conveying the residue towards an outlet aperture provided therefor.

In a prior construction of a centrifugal filter there is provided a residue ejector in the form of a shovel which is rotatable about the axis of the hollow shaft of the filter. The shovel is disposed in the bottom of the housing underneath or laterally of the filter elements to convey the residue towards the outlet aperture, which is provided in the bottom of the housing.

The invention has for its object to provide a centrifugal cleaning filter of uncomplicated structure, in which rapid transportation of residue to the outlet aperture and ejection thereof are possible.

The essential features of the invention are the provision of a surface portion of the shovel for sweeping across the outlet aperture having a forward inclination in the direction of rotation. This causes the said portion to form with the bottom of the housing an acute angle, the aperture of which faces in the direction of rotation, whereby the residues are pressed downwardly and are forced into the outlet aperture by the inclined portion referred to.

In order to facilitate rapid transportation of the residue, which is radially inward or outward of the center of the outlet aperture, to the forwardly inclined portion when the ejector rotates, there is provided at least one shovel having a portion of its surface, the path of which relative to the axis of rotation is radially inward and/or outward of the center of the outlet aperture, comprising a zone which is close to the center of the aperture and is at least partially located rearward of a zone that is farther from the center, whereby the surface portion diverges from the radial direction relative to the axis of rotation.

In a particularly simple embodiment of the invention, a shovel which is forwardly inclined in the direction of rotation is combined with a shovel which diverges from the radial direction relative to the axis of rotation and is preferably disposed opposite to the first-mentioned shovel, the surface of the second shovel being approximately parallel to the axis of rotation. This makes it possible to produce the shovels in simple manner from plates or sheets of metal.

In order to achieve approximately equal loading on the portions of the shovels, the lower edge of the forwardly inclined surface portion may sweep an annular zone which is adjacent to that swept by the other surface portion. Preferably, the annular zone swept by the forwardly inclined surface portion is radially outward of the other zone, so that the surface portion diverging from the radial direction has a centrifugal effect, whereas the forwardly inclined portion has a downward effect.

Particularly favorable conditions are achieved if the center of the outlet aperture, which preferably reaches approximately to the wall of the housing, is located approximately in the path of the radially outward end of the surface portion which diverges from the radial direction, since this makes it possible to provide a large outlet aperture, the diameter of which is substantially equal to the radius of the bottom of the housing.

The shovels can be protected against excessive loading by means of one or more perforations provided therein.

In a favorable embodiment, at least one shovel is provided with an elastic scraper blade for complete removal of the residue from the bottom of the housing.

Since the invention causes very effective removal of the residue, the bottom of the housing does not have to be of complicated construction in view of facilitating such removal, but a simple flat form or concave form of bottom can be used.

The energy for operating the residue ejector can be derived in simple manner from the hollow shaft.

BRIEF DESCRIPTION OF THE DRAWINGS

The invention will be described in more detail below with reference to the drawings, in which.

DESCRIPTION OF THE EMBODIMENTS

Figure 1:
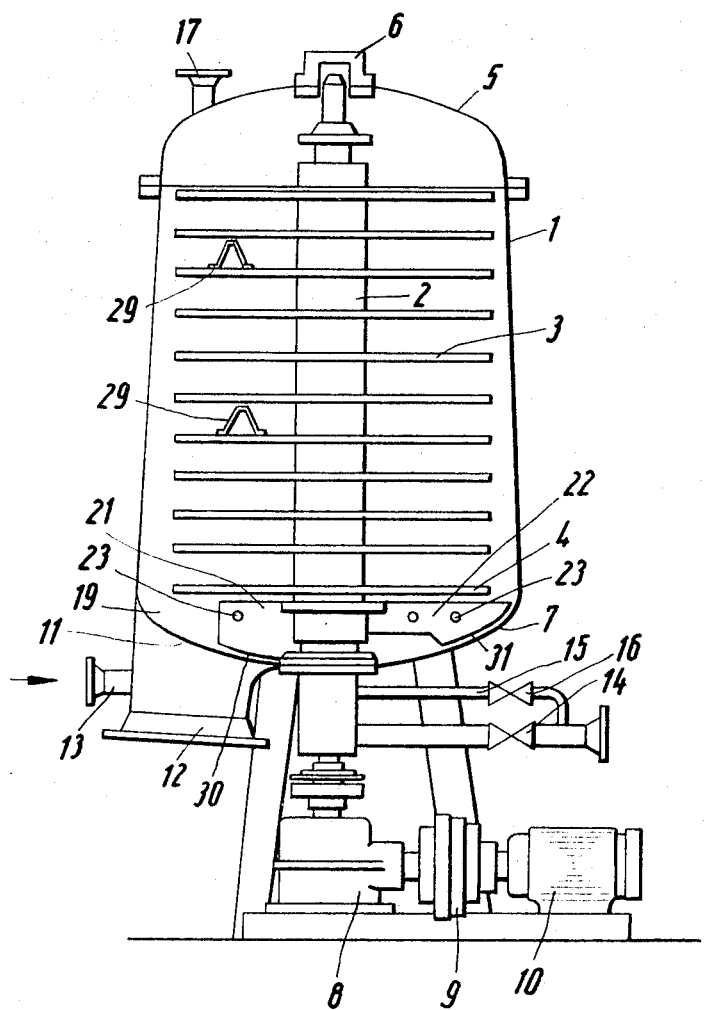
FIG. 1 shows a centrifugal cleaning filter in vertical section.
Figure 2:
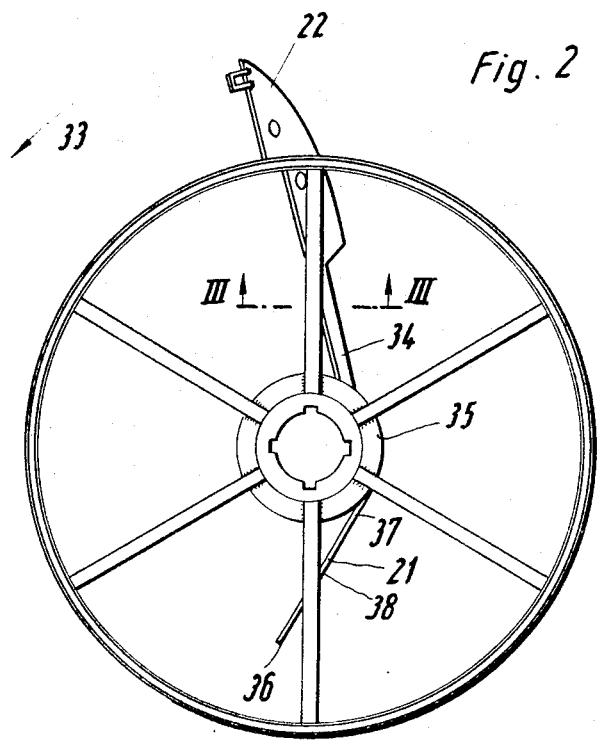
FIG. 2 is a horizontal section of the filter of FIG. 1.
Figure 3:
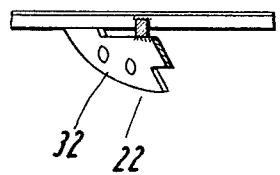
FIG. 3 is a section taken on line III—III of FIG. 2.

As is apparent from FIGS. 1–3, the cleaning filter comprises a housing 1 exhibiting rotational symmetry relative to a vertical axis. Provided in the center of the filter is a hollow shaft 2, on which there are supported equally spaced filter elements 3, 4 in the form of circular discs in horizontal arrangement. The interior diameter of housing 1 is larger in the region of the uppermost element 3 than the exterior diameter of element 3 and tapers outwardly from the top down, the diameter of all of the filter elements 3, 4 being equal.

Hollow shaft 2 is rotatably mounted in a bearing 6 provided in the lid 5 of housing 1. The lower end of shaft 2 extends downwardly through the bottom 7 of the housing outside of the same and is flanged to the drive shaft of an angular gearing 8, which is driven from an electric motor 9 via a hydraulic transmission 10, such as an oil transmission.

Provided at the bottom 7 of housing 1 to one side of hollow shaft 2 and between the same and the wall of the housing is an outlet aperture 11 formed by the upper aperture of an ejector channel 12. Provided on the outward side of channel 12 relative to hollow shaft 2 is a horizontal tubular section 13 for supplying to housing 1 the liquid to be filtered. Filter elements 3, with the exception of the lowermost element 4, are connected via channels provided in hollow shaft 2 (not shown) with a conduit 14 for the filtered liquid, which is located under bottom 7. Disposed above conduit 14 is an additional conduit 15 for the filtered liquid, which is connected with one or more of the lowermost filter elements 4. Conduit 15 is connected via a valve 16 to conduit 14. Provided in the lid 5 of housing 1 is a tubular section 17 for connection to a pressure gas source.

Below or laterally of filter element 4 in the bottom area 19 of housing 1 is provided an ejector device surrounding hollow shaft 2 and comprising plate-shaped residue shovels or scrapers 21, 22, extending from hollow shaft 2 outwards. The lower edge 30 of shovel 21 sweeps over an inner annular zone extending from the periphery of hollow shaft 2 approximately to the center of outlet aperture 11, whereas the other shovel 22 of greater length covers the outer third of the radial extension of housing 1 and bottom 7 and the lower edge 31 thereof sweeps over an annular zone extending approximately from the center of outlet aperture 11 up to the wall of housing 1. The lower edges 30, 31 extend in immediate proximity to the housing bottom and may be formed by elastic scraper blades (not shown). Provided in shovels 21, 22 are circular apertures 23, which are of particular advantage when the quantity of residue per unit time is large.

As is apparent from FIGS. 2 and 3, the ejector or scraper surface formed by the front surface 32 of shovel 22 is inclined forwardly with regard to the direction of rotation (arrow 33), so as to form with bottom 7 an acute angle facing in the direction 33. This causes downwardly directed force to be exerted by shovel surface 32 on the residue to be removed and forces it, when sweeping across outlet aperture 11, down into channel 12. Shovel 22 is attached via an arm 34 thereof to a sleeve 35, which is coaxial with hollow shaft 2, and diverges from the radial direction relative to the axis of rotation so as to be substantially tangential to sleeve 35. Since scraper 32 of shovel 22 has a corresponding tangential disposition, there is exerted on the residue by the outer end of surface 32 an inwardly directed force for transportation of the residue towards the center of aperture 11 and into channel 12.

Shovel 21, which sweeps across an inner annular zone, also diverges from the radial direction, however, in the opposite direction, being also tangentially attached to sleeve 35 and having its outer end 36, which is proximate to the outlet aperture 11, disposed to the rear of the inner end 37 relative to the direction 33. Since surface 38 of shovel 21 is parallel to the axis of rotation, it effects an outward force on the residue towards the center of aperture 11 and into the area of shovel 22.

In operation, the liquid to be filtered is supplied to channel 13 and pumped into housing 1. This causes a flow in channel 12 which contributes to preventing the deposition of solid substance in the lower portion of the housing. The liquid entering through channel 13 is filtered by filtering means held in tension on elements 3 and flows in the filter plate to hollow shaft 2 and issues via channel 14. The impurities contained in the liquid are deposited on the upper surfaces of elements 3 and form a homogeneous cake of filtered material. Towards the end of the process, valve 16 of channel 15, which was closed during the above-described first phase of the process, is opened to put into operation the heretofore inactive element 4. The content of the filter housing is now forced downwardly with the aid of pressure gas supplied via tube 17 down to the level of the so-called residual filter plate 4.

After this process and possibly after the treatment of the residual cake formed, such as by washing, extraction, drying, or the like, hollow shaft 2 with filter elements 3, 4 is set in rotation by motor 9, shovels 21, 22 participating in the rotation. The residue cakes on filter elemens 3, 4 are thrown outwardly by the centrifugal force and are shattered by distance members 29 provided between elements 3 and drop to the bottom along the inner wall of housing 1. Shovels 21, 22 rotating in the bottom region 19 of the housing push the broken-up residue in the manner already described into aperture 11, and they are then ejected through channel 12.

Figure 4:
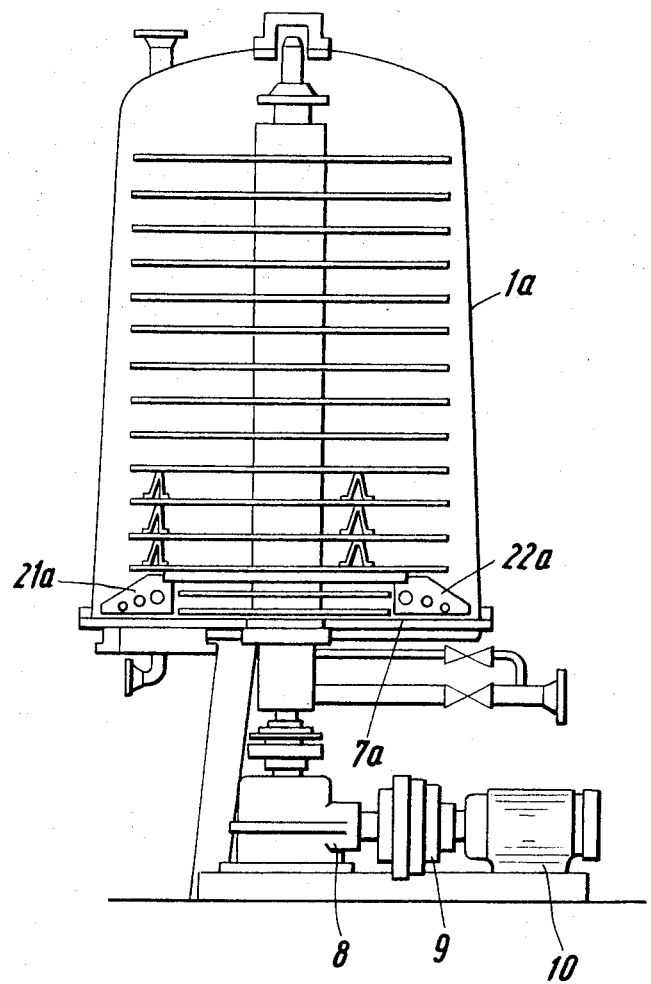
FIG. 4 shows a further embodiment in vertical section.

The construction described of shovels 21, 22 makes it possible to use a simple form of rounded bottom 7 as shown. It is also possible to construct the housing 1a according to FIG. 4 with a flat bottom 7a, keeping in mind that the shovels 21a, 22a must be modified correspondingly at the lower edges thereof. These forms of bottoms have the advantage that the residual material which is left after the filtration is of substantially smaller volume than if the bottom is conical. A further advantage of the invention is that the time and quantity of pressure gas necessary for the filtration process is considerably lower than in previously known constructions.

That which is claimed is

1. Centrifugal cleaning filter comprising:
a housing for said filter,
a vertically disposed hollow shaft rotatable in said housing and having horizontally disposed filter elements in stacked arrangement on said shaft,
a residue ejector means rotatable in a predetermined direction about the axis of said hollow shaft having at least one ejector shovel and at least one surface portion disposed below and laterally of said filter elements in a bottom region of the housing,
an outlet aperture provided within the area swept by said shovel in the bottom of said housing,
characterized in that at least the surface portion of said shovel which extends laterally from said shaft sweeps across said outlet aperture and is at least partially inclined forward relative to the direction of rotation of said shovel whereby the ejector means sweeps over said bottom to discharge the residue into said aperture.

2. A centrifugal filter as claimed in claim 1, in which the surface of said shovel comprises a first and a second zone, said first zone being closer to the center of said aperture and at least partially rearwardly disposed with regard to said direction of rotation relative to said second zone.

3. A centrifugal filter as claimed in claim 2, comprising a first shovel forwardly inclined relative to said direction of rotation and a second shovel diverging from the radial direction relative to and having a surface portion approximately parallel to said axis of rotation.

4. A centrifugal filter as claimed in claim 3, in which the lower rim of said forwardly inclined surface portion sweeps an annular zone adjacent to the annular zone swept by said surface portion of said other shovel.

5. A centrifugal filter as claimed in claim 3, in which said second shovel is disposed opposite to said first shovel.

6. A centrifugal filter as claimed in claim 2, in which the center of said outlet aperture is disposed within the area swept by the radially outward end of said surface portion of said second shovel.

7. A centrifugal filter as claimed in claim 6, in which said outlet aperture extends substantially to the circumference of said housing.

8. A centrifugal filter as claimed in claim 1, comprising at least one shovel having the form of a flat plate.

9. A centrifugal filter as claimed in claim 1, having apertures provided in at least one of said shovels.

10. A centrifugal filter as claimed in claim 1, having an elastic scraper blade on at least one of said shovels.

11. A centrifugal filter as claimed in claim 1, in which the bottom of said housing is flat.

12. A centrifugal filter as claimed in claim 1, in which the bottom of said housing is concave.

13. A centrifugal filter as claimed in claim 1, in which the surface of said shovel is complemental to the bottom region of the housing.

* * * * *